United States Patent
Zhang et al.

(10) Patent No.: US 8,299,435 B2
(45) Date of Patent: Oct. 30, 2012

(54) TUNABLE BROADBAND ANTI-RELFECTION APPARATUS

(75) Inventors: Xi-Cheng Zhang, Melrose, NY (US); Pengyu Han, Troy, NY (US); Yuting W. Chen, Hyde Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 337 days.

(21) Appl. No.: 12/855,332

(22) Filed: Aug. 12, 2010

(65) Prior Publication Data

US 2011/0036984 A1 Feb. 17, 2011

Related U.S. Application Data

(60) Provisional application No. 61/233,204, filed on Aug. 12, 2009.

(51) Int. Cl.
*G01J 5/08* (2006.01)
(52) U.S. Cl. .................................. 250/341.1
(58) Field of Classification Search .................. 250/330, 250/338.1, 340, 341.1, 341.5, 341.8
See application file for complete search history.

(56) References Cited

U.S. PATENT DOCUMENTS 7,531,802 B2    5/2009    Zhang et al.

OTHER PUBLICATIONS

Englert et al., Antireflection Coated, Wedged, Single-Crystal Silicon Aircraft Window for the Far-Infrared, IEEE Transactions on GeoScience and Remote Sensing, vol. 37, No. 4. Jul. 1999, pp. 1997-2003.

Huang et al., Improved Broadband and Quasi-Omnidirectional Anti-Reflection Properties With Biomimetic Silicon Nanostructures, Nature Nanotechnology, vol. 2, Dec. 2007, pp. 770-774.
Prasad et al., The Effect of Structural Disorder on Guided Resonances in Photonic Crystal Slabs Studied With Terahertz Time-Domain Spectroscopy, Optic Express, vol. 15, No. 25, Dec. 10, 2007, pp. 16954-16965.
Iwao Hosako; Mutlilayer Optical Thin Films for Use at Terahertz Frequencies: Method of Fabrication, Applied Optics, vol. 44, No. 18, Jun. 20, 2005, pp. 3769-3773.
Poitras et al., Toward Perfect Antireflection Coatings. 2 Theory, Applied Optics, vol. 43, No. 6, Feb. 20, 2004, pp. 1286-1295.
Bruckner et al., Broadband Antireflective Surface-Relief Structure for THz Optics, Optic Express, vol. 15, No. 3, Feb. 5, 2007, pp. 779-789.
Kuroo et al., Triangular Surface-Relief Grating for Reduction of Reflection From Siliocn Surface in the 0.1-3 Terahertz Region, CLEO/QELS 2008, 2-pages.
Thoman et al., Nanostructured Gold Films as Broadband Terahertz Antireflection Coatings, Physical Review B 77 195405 (2008), 9-pages.
Bruckner et al., Broadband Antireflective Structures for the THz Spectral Range Fabricated on High Resistive Float Zone Silicon, IEEE, 2-pages, 2008.

(Continued)

*Primary Examiner* — Mark R Gaworecki
(74) *Attorney, Agent, or Firm* — Heslin Rothenberg Farley & Mesiti P.C.

(57) ABSTRACT

A broadband anti-reflection apparatus for use with terahertz radiation includes a layer having an outer surface comprising a plurality of pyramid structures having about a 30 μm to about a 110 μm period, and wherein reflectance of the terahertz radiation is reduced compared to a layer comprising a planar outer surface. Also disclosed is a method for modifying terahertz radiation which includes receiving terahertz radiation on a device having an anti-reflection layer having an outer surface comprising a plurality of pyramid structures having about a 30 μm to a 110 μm period, and modifying the terahertz radiation passing through the device or processing the terahertz radiation in the device.

24 Claims, 5 Drawing Sheets

OTHER PUBLICATIONS

Kanamori et al., Broadband Antireflection Gratings Fabricated Upon Silicon Substrates, Optic Letters, vol. 24, No. 20, Oct. 15, 1999, pp. 1422-1424.

Lalanne et al., Antireflection Behavior of Silicon Subwavelength Periodic Structures for Visible Light, Nanotechnology vol. 8, (1997), pp. 53-56.

Bouffaron et al., Enhanced Antireflecting Properties of Micro-Structured Top-Flat Pyramids, Optics Express, vol. 16, No. 23, Nov. 10, 2008, pp. 19304-19309.

Ting et al., Subwavelength Structured Surfaces With a Broadband Antireflection Function Analyzed by Using a Finite Difference Time Domain Method, Optik—International Journal for Light and Electron Optics, vol. 121, Issue 12, Jun. 2010, pp. 1069-1074.

Botez et al., Specular Reflectivity From Pyramidal Surfaces Mophologies, Physica B: Condensed Matter, vol. 336, Issue 1-2, Aug. 2003, pp. 130-135.

Murai et al., Hexagonal Pyramid Shaped Light-Emitting Diodes Based on ZnO and GaN Direct Wafer Bonding, Applied Physics Letters, vol. 89, Issue 17, Oct. 2006, 1-page abstract.

RECEIVING TERAHERTZ RADIATION ON A DEVICE HAVING AN ANTI-REFLECTION LAYER COMPRISING A PLURALITY OF PYRAMID STRUCTURES HAVING ABOUT A 30 µm TO A 110 µm PERIOD

MODIFYING THE TERAHERTZ RADIATION PASSING THROUGH THE DEVICE OR PROCESSING THE TERAHERTZ RADIATION IN THE DEVICE.

*Fig. 8*

TUNABLE BROADBAND ANTI-RELFECTION APPARATUS

CROSS-REFERENCE TO RELATED APPLICATION

This application claims the benefit of U.S. Provisional Application No. 61/233,204, filed Aug. 12, 2009, entitled "Tunable Broadband Anti-Reflection Apparatus", which is hereby incorporated herein by reference in its entirety.

GOVERNMENT RIGHTS

This invention was made with Government support under contract number W911NF-07-1-0278, between the U.S. Army Research Office and Rensselaer Polytechnic Institute. The Government has certain rights in the invention.

FIELD OF THE INVENTION

This invention relates generally to terahertz radiation, and in particular to anti-reflection surfaces suitable for use with terahertz radiation.

BACKGROUND OF THE INVENTION

Silicon, especially high-resistivity silicon, is widely used in terahertz (THz) components due to its broadband transparent window spanning from microwave to mid-infrared with little absorption of electromagnetic waves. Its range of application in THz spectroscopy spans from windows and lenses to filters and beam-splitters. However, because of its inherent high dielectric constant, silicon is usually associated with high Fresnel reflection loss (30% reflectivity in THz power from a single surface) and possibly limiting spectral resolution stemming from the finite time window as a result of strong secondary reflection from its surfaces.

Previously, anti-reflection (AR) coatings for silicon have been implemented in several ways:

1) One method was to use quarter-wave thin film as AR layer which had a refractive index of $n=\sqrt{n_{silicon}}$. Unfortunately, this method was only suited to enhance transmission of a single frequency, and is inadequate for broadband THz time-domain spectroscopy.
2) Silicon nano-tip was reported as another AR coating method, whose improvement of transmission was unfortunately limited to frequencies higher than 1 THz.
3) A photonic crystal slab made with air holes in silicon was illustrated as another option to enhance transmission from 0.1 THz to 0.45 THz, but, unfortunately, the AR effect was narrowband with performance at higher frequencies dramatically deteriorated.
4) Multi layer coating has been used for broadband anti-reflection. Unfortunately, the design and fabrication process is complicated with a multi-layer coating method due to a lack of materials which have low absorption and suitable refractive index between that of silicon and air at THz frequency.

Therefore, there is a need for a tunable broadband anti-reflection apparatus having improved broadband anti-reflection functions at terahertz (THz) frequencies, which may be manufactured and tuned through a practical process.

SUMMARY OF THE INVENTION

In a first aspect, the present invention provides a method for modifying terahertz radiation. The method includes receiving terahertz radiation on a device having an anti-reflection layer having an outer surface comprising a plurality of pyramid structures having about a 30 μm to a 110 μm period, and modifying the terahertz radiation passing through the device or processing the terahertz radiation in the device.

In a second aspect, the present invention provides a broadband anti-reflection apparatus for use with terahertz radiation. The apparatus includes a layer having an outer surface comprising a plurality of pyramid structures having about a 30 μm to about a 110 μm period, and wherein reflectance of the terahertz radiation is reduced compared to a layer comprising a planar surface.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

FIG. 8 is a flowchart of a method for modifying terahertz radiation in accordance with an aspect of the present invention.

DETAILED DESCRIPTION OF THE INVENTION

In one embodiment, crystallographic wet etching was employed for the fabrication of anti-reflective (AR) components. First, a 0.5 μm thick layer of $SiO_2$ was deposited on <100> silicon substrate (p-type, resistivity>15 KΩ-cm) using plasma-enhanced chemical vapor deposition. The substrate with the oxide mask layer then underwent standard UV photolithography process, during which a desired pattern was transferred from the photoresist to the oxide mask. In this embodiment, the patterns are two-dimensional closed-packed square arrays with sides aligned to the major flat of <100> silicon wafer.

Commercially available 25% tetramethylammonium hydroxide with surfactant was used as the etching solution. Our etching recipe was crystallographic as the etch rate in <100> direction was 6 times faster than that in <110> direction and 60 times faster than that in <111> direction, which produced square micro-pyramid with an apex angle of 72 degrees formed by four <111> planes. After the etching was completed, the oxide mask was removed in buffered hydrofluoric solution. Five different samples were fabricated, in similar embodiments, by varying the etch rates in different planar directions with micro-pyramid periods of 110 μm, 70 μm, 60 μm, 45 μm, and 30 μm. The etch rate depended on etching solution temperature and concentration. For our recipe in this embodiment, approximate etch rates are summarized in the table below.

| Crystal Plane Direction | Etch rate |
| --- | --- |
| <100> | 0.6 μm/min |
| <110> | 0.1 μm/min |
| <111> | 0.01 μm/min |

Figure 1:
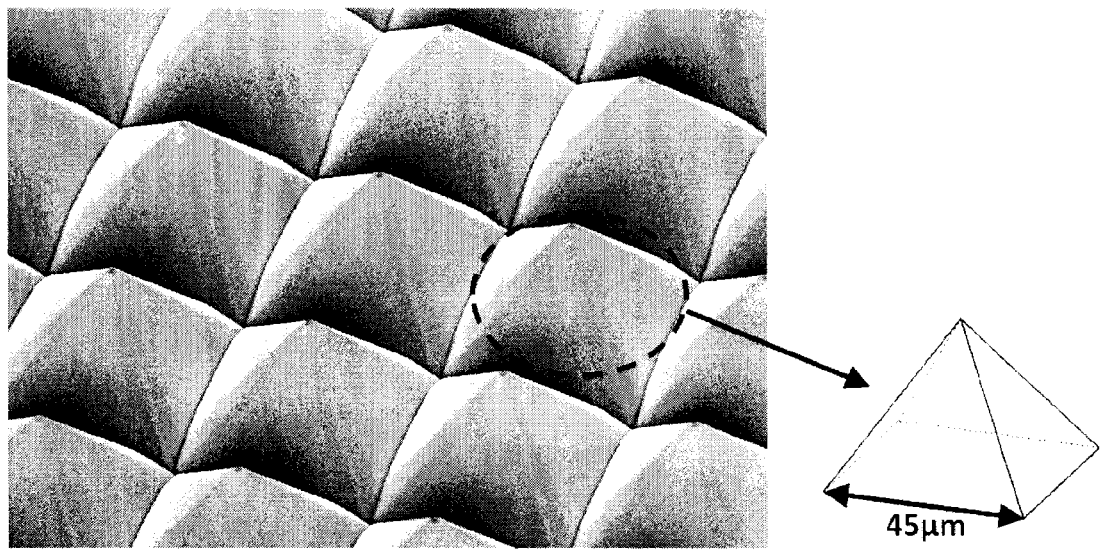
FIG. 1 is a SEM image of a silicon surface with 45-μm-period micro-pyramid structures in accordance with one aspect of the present invention.

FIG. 1 shows an SEM image of silicon with 45-μm period micro-pyramid surface structure. It will also be appreciated that the pyramid structure may include a right pyramid, a non-right pyramid, a square pyramid, a rectangular pyramid, a triangular pyramid, a pentagonal pyramid, and a hexagonal pyramid.

A standard THz time domain spectrometer (THz-TDS) in transmission mode was used to demonstrate the antireflection performance of the silicon samples with various one-sided micro-pyramid surface structures. The results were compared with that of planar silicon substrate. The available spectra of the spectrometer spanned from 0.2 THz to 4 THz by using a GaP crystal sensor. Planar silicon substrate and samples with AR structures were positioned in the path of terahertz pulses with normal incidence. Relative transmission spectra of THz field amplitude were calculated as THz amplitude spectra through the samples divided by that through planar silicon substrate.

Figure 2:
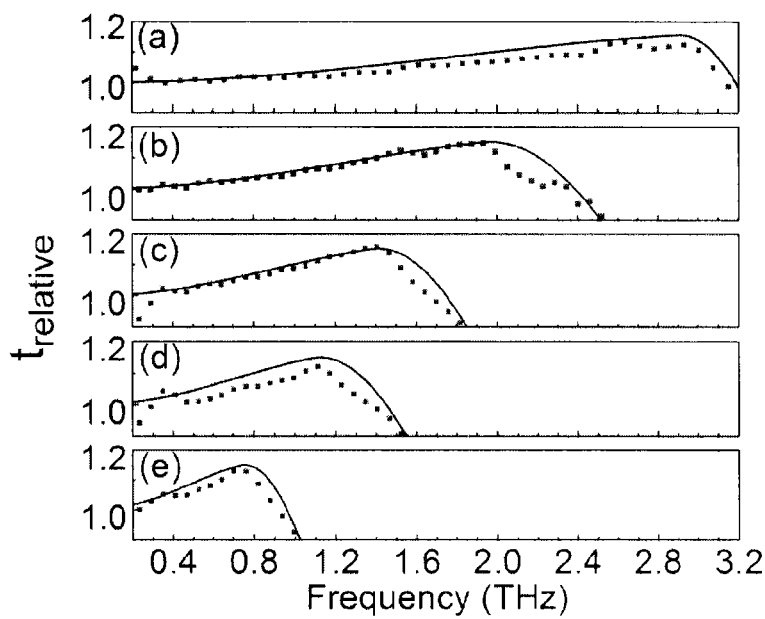
FIG. 2 is a graph of the relative transmission amplitude ($t_{relative}$) of micro-pyramid structured samples with periods (a) 30 μm, (b) 45 μm, (c) 60 μm, (d) 70 μm and (e) 110 μm, and with experimental and simulation results shown by the scattered symbols and solid lines, respectively.

FIG. 2 shows the experimental results in scattered symbols. Silicon samples with micro-pyramid periods from 110 μm to 30 μm have relative transmission peak amplitudes of 1.13, 1.12, 1.16, 1.15, and 1.13, respectively. The peaks of relative transmission are located at 0.75 THz, 1.11 THz, 1.41 THz, 1.93 THz, and 2.93 THz in the order defined previously. The transmission enhancement effect of these silicon samples has different bandwidth. As observed from the embodiments illustrated in FIG. 2, silicon samples with smaller periods have larger anti-reflection bandwidth. Samples with micro-pyramid periods from 110 μm to 30 μm have AR bandwidths of 0.91 THz, 1.35 THz, 1.67 THz, 2.34 THz, and 3.15 THz, respectively.

To understand the anti-reflection effect of micro-pyramid structure from the viewpoint of impedance matching between air and silicon substrate, we used the graded index method to simulate their performance. Each thin layer in the pyramid was considered to have an effective refractive index of:

$$n_{eff} = \sqrt{f \cdot 3.4^2 + (1-f) \cdot 1^2}$$

where f was the filling factor (area fraction) of silicon in that particular layer. Using matrix calculation, each layer of the medium was represented by a propagation matrix $P_{(i)}$. Similarly, each interface between two mediums of different refractive index was represented by a transmission matrix $M_{(i-1)}$. The overall transmission matrix M was written as:

$$P_{(1)} \cdot \prod_{i=2}^{n} M_{(i-1)} P_{(i)}$$

in which n was the number of layers, $p_n$) and $P_{(1)}$ were the transmission matrices for silicon and air, respectively. The transmission and reflection of the system were obtained by converting the transmission matrix M into scattering matrix S. When the number of layers was greater than 500, the simulation result converged. Based on the matrix calculation, the relative transmission amplitude approached a maximum value of 1.194 at high frequencies for all micro-pyramid structures without considering diffraction. In this case, relative field transmission amplitude of 1.194 was substantially equivalent to zero reflectivity, giving an upper limit on the performance of these AR silicon samples. We note that the AR effect was mainly determined by the height of the pyramid which was directly related with the period of the pyramids by:

$$h = \frac{\Lambda}{2} \times \tan 54.7°$$

where Λ is the period of the micro-pyramid.

Diffraction effect begins to strongly influence THz transmission of these samples when their pyramid periods approach the order of THz wavelength. As a result, each micro-pyramid structured sample has its specific peak frequency, above which diffraction starts to occur and the transmitted THz amplitude (zero order diffraction) begins to decrease.

This frequency is named as the cut-off frequency and can be calculated by the expression of:

$$f_C = \frac{c}{\Lambda \cdot n}$$

where c is the speed of light and n (3.4) is the refractive index of silicon in the terahertz range. In our simulation, we applied an analytical diffraction function to the graded index simulation of each micro-pyramid structure. Solid lines in FIG. 2 represent the simulated curves of relative transmission of each sample. The simulated spectra fit the experimental spectra reasonably well.

Figure 3:
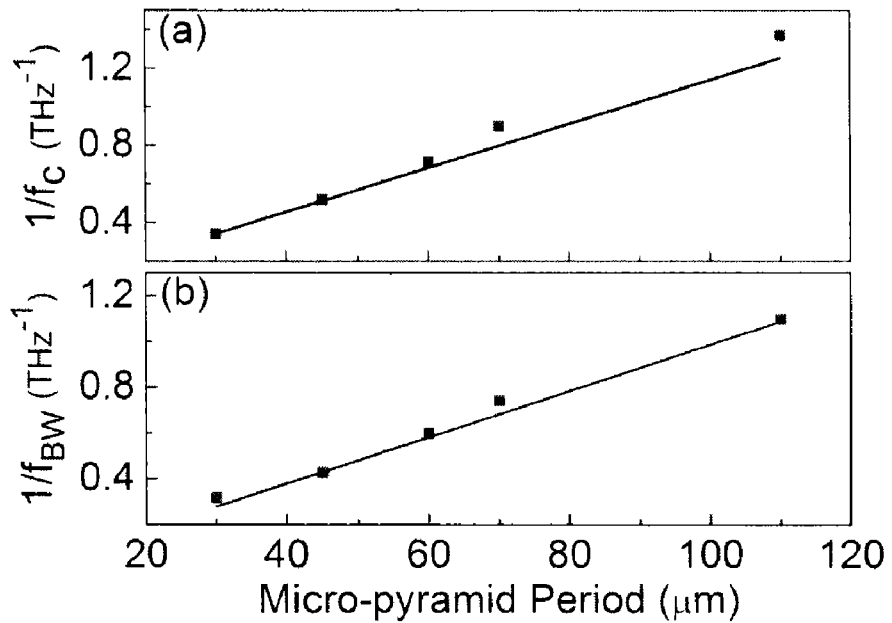
FIGS. 3(a) and 3(b) are graphs of the reciprocals of cut-off frequency ($f_C$) and bandwidth ($f_{BW}$) of micro-pyramid structured samples as a function of sample periods with experimental and simulation results shown by the scattered symbols and solid lines.

FIG. 3(a) plots the reciprocal of measured cut-off frequency versus micro pyramid period in scattered symbols. It has a well-defined linear dependency on pyramid period. Experimental results agree well with the calculated ones using the equation above, which are represented by the solid line. Furthermore, each micro-pyramid structured sample has a particular bandwidth of anti-reflection effect. FIG. 3(b) illustrates the reciprocal of the measured bandwidth against micro-pyramid period in scattered symbols. Experimental results show a linear dependency on pyramid period and are reproduced by simulation very well.

Figure 4:
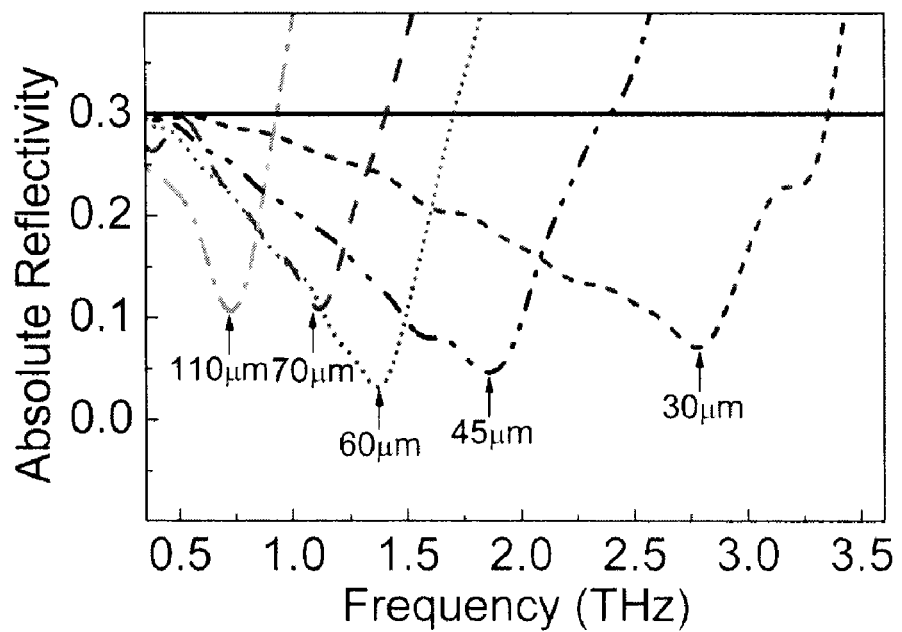
FIG. 4 is a graph of the power reflectivity plotted for samples with various micro-pyramid structure periods and illustrated by different lines, and with the reflectivity of planar silicon shown by a solid line.

To better demonstrate micro-pyramid structured samples' AR performance, we plotted the reflectivity for the sample embodiments. FIG. 4 shows the absolute power reflectivity of each sample, as well as that of planar silicon for comparison. It was obtained by considering reflection and transmission from both surfaces of the silicon sample and using the data in FIG. 2. Embodiments with different micro-pyramid structure periods show different reduction of reflectivity. Micro-pyramid structure with greater height has better anti-reflection effect in lower frequencies, but starts to roll off more quickly above cut-off frequency because of diffraction. For example, the 60-μm-period micro-pyramid structured sample has a minimum reflectivity of 3% at 1.41 THz, corresponding to a maximum reduction of reflectivity by 89% when comparing with planar silicon. However, its anti-reflection effect retrogrades beyond 1.67 THz. The 30-μm-period micro-pyramid structured sample exhibits the best overall anti-reflection effect among all samples. It displays superior anti-reflection performance over a broad frequency range. In general the maximum reduction in power reflectivity is over 80% for most samples, comparing with planar silicon.

Figure 5:
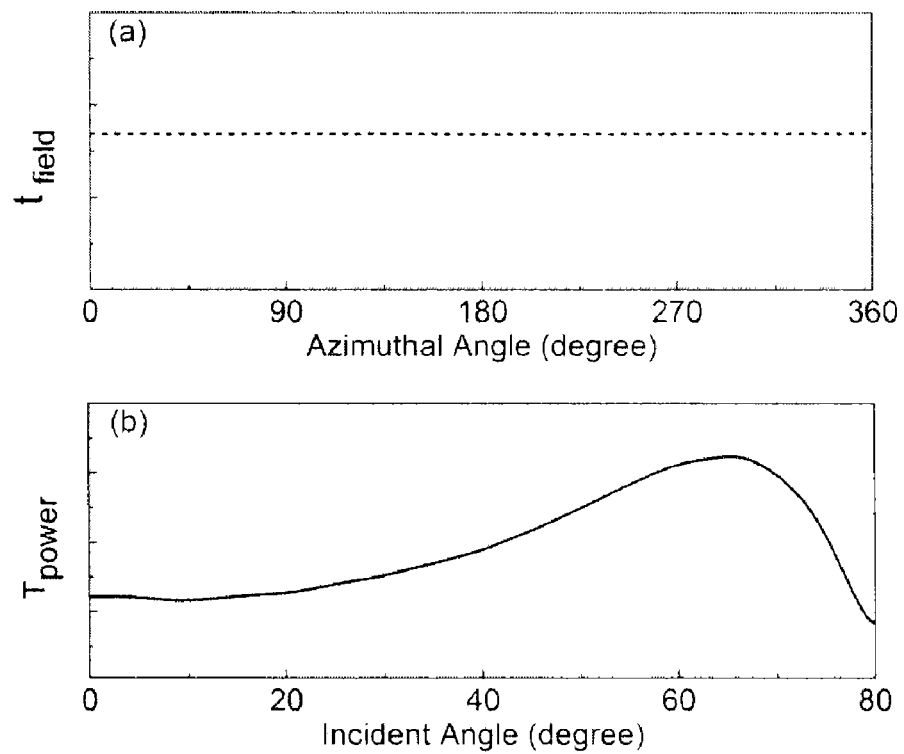
FIGS. 5(a) and 5(b) are graphs of the polarization independence of THz transmission through AR devices verified by rotating the azimuthal angle, and Incident angle dependence of THz transmission through AR devices by tuning the incident angle.

The disclosed embodiments of anti-reflection designs with crystallographic wet etched micro-pyramid surface structures, as well as their equivalents, have many advantages. The fabricated samples are polarization independent at normal incidence. FIG. 5(a) shows the azimuthal angle-dependence of transmitted peak THz field amplitude of the 30 μm period sample. The amplitude virtually stayed the same as the azimuthal angle was rotated from 0 to 360 degrees. Besides, the samples are mostly independent of incident angle when the angle is less than 20 degree, as shown in FIG. 5(b), which illustrates transmitted THz power as a function of incident angle for the sample with 60 μm period.

Furthermore, the size of pyramid can be precisely tuned to control the bandwidth and cut-off frequency. In addition, the size of pyramid is in the order of tens of microns and does not alter the silicon substrate too much. Optimization of the pyramid period may result in broader spectra of enhanced transmission. Although the apparatus has been demonstrated as anti-reflection device for silicon substrate, this design can be also used for other substrate material, such as semiconductors, polymers, and so on.

Embodiments of an apparatus for achieving tunable and broadband anti-reflection functions for silicon at terahertz frequency has been disclosed. Silicon, especially high resistivity silicon, is widely used in terahertz (THz) components due to its broadband transparent window spanning from microwave to mid-infrared with little absorption of electromagnetic waves. However, because of its inherent high dielectric constant, silicon is usually associated with high Fresnel reflection loss (30% reflectivity in THz power from a single surface) and possibly limiting spectral resolution stemming from the finite time window as a result of strong secondary reflection from its surfaces. To improve system performance, it is of great importance to reduce the reflection at air-silicon interface in order to increase dynamic range and improve spectral resolution.

The embodied apparatus comprises one or more thin layers of sub-wavelength structure at the substrate surface. Much improved impedance matching has been achieved at the interface between air and silicon substrate, reducing THz reflection significantly. So far, anti-reflection effects have been realized in a broadband range from 0.2 THz to 3.2 THz. A maximum 89% reduction in reflectivity of THz power has been observed, comparing with reflectivity of planar silicon substrate. By varying the thickness of the anti-reflection layer, the cut-off frequency of enhanced transmission has been tuned from 0.74 THz to 2.93 THz and the bandwidth of enhancement has increased from 0.91 THz to 3.15 THz, respectively. Although the apparatus has been demonstrated as anti-reflection device for silicon substrate, this design can be also used for other substrate material, such as semiconductors (for example, but not limited to GaAs and InP), polymers, and so on.

Figure 6:
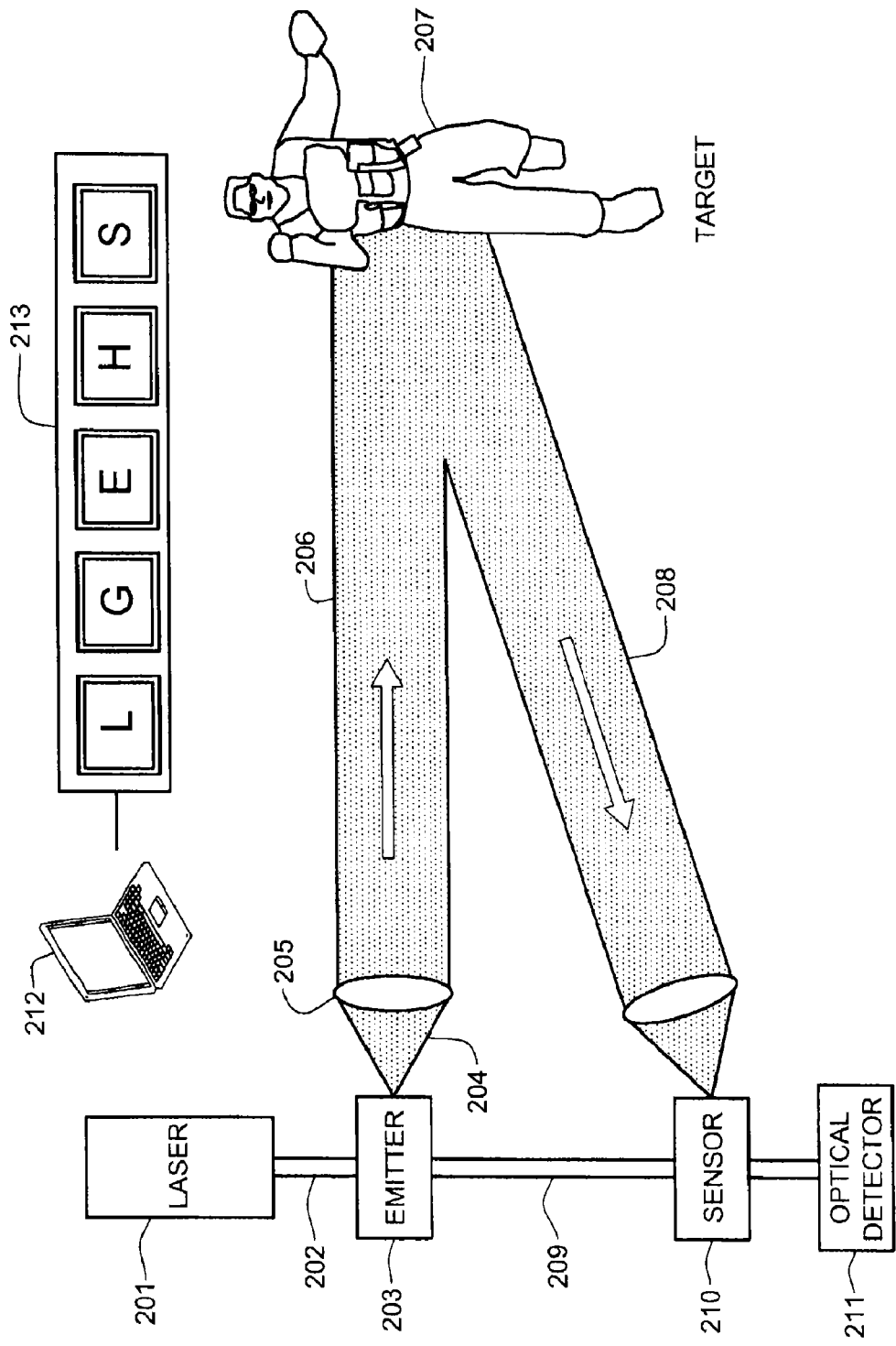
FIG. 6 is one embodiment of a system for remotely analyzing an object employing devices comprising the pyramid structures in accordance with one aspect of the present invention.

The tunable broadband and anti-reflection apparatus may be employed with systems having lenses, beam splitters, filters, and other components for modifying and processing terahertz radiation. For example, the system may include a system for remotely analyzing an object such as shown in FIG. 6.

In this illustrated embodiment, a laser source 201 provides an optical-wavelength pump beam 202 that is focused in a volume 203 of ambient gas. Excitation of the gas in volume 203 by optical pump beam 202 induces the excited gas to emit terahertz radiation. Emitted terahertz radiation 204 is directed to targeted object 207. Optionally, emitted terahertz radiation 204 may be concentrated by a lens or terahertz focusing device 205. Incident terahertz wave 206 interacts with targeted object 207, and targeted object 207 reflects a portion of incident terahertz wave 206 as reflected terahertz wave 208. In this embodiment, optical probe beam 209 is split via beam splitter from optical pump beam 202. Optical probe beam 209 is focused in another volume 210 of the ambient gas, wherein the gas is excited by optical probe beam 209 about its focal point. Reflected terahertz wave 208 is incident at volume 210, wherein the excited gas emits an optical signal comprising a second harmonic of the optical probe beam's frequency as a result of a nonlinear mixing of the optical probe beam and reflected terahertz wave. The optical signal emitted as a result of the nonlinear interaction of the optical probe beam and reflected terahertz wave may be detected with an optical detector 211, and computer 212 processes the detected optical signal to obtain the targeted object's signature. Computer 212 may provide display 213 with information pertaining to an analysis of the targeted object based on its detected signature. Optionally, reflected terahertz wave 208 may be focused in volume 210 by a terahertz focusing device. A further description of various systems employing lenses, beam splitters, filters, and other components for remotely analyzing an object are disclosed in U.S. Pat. No. 7,531,802 issued to Zhang et al. and entitled "Method Of Analyzing A Remotely-Located Object Utilizing An Optical Technique To Detect Terahertz Radiation," the entire contents of which are incorporated herein by reference.

Figure 7:
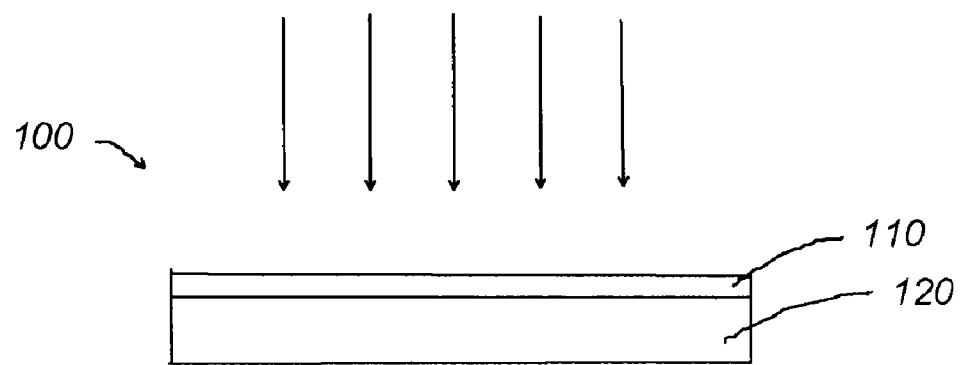
FIG. 7 is an illustration of the type of devices employed in the system of FIG. 6.

FIG. 7 is an illustration of a device 100 comprising an anti-reflection layer 110 comprising an upper surface having a plurality of pyramid structures in accordance with one aspect of the present invention. The plurality of pyramid structures may have a period of about a 30 μm to about a 110 μm. The layer may be disposed on a component 120 for modifying the terahertz radiation passing through the device or processing the terahertz radiation. For example, the component may be a lens for focusing the terahertz radiation, a filter for filtering the terahertz radiation, a beam splitter for directing a first portion of the terahertz radiation a first direction and directing a second portion of the terahertz radiation a second direction different from the first direction, and a semiconductor device for processing the terahertz radiation. It will be appreciated that other component for modifying and/or processing the terahertz radiation may be suitably employed.

FIG. 8 is a flowchart of a method for modifying terahertz radiation in accordance with an aspect of the present invention.

Embodiments of an apparatus for achieving tunable and broadband anti-reflection functions are disclosed for substrates, such as, but not limited to silicon, at terahertz (THz) frequencies. In one embodiment, the apparatus comprises one or more thin layers of sub-wavelength micro-pyramid structure at a silicon surface. These pyramids are closely packed and uniformly distributed in two dimensions. Much improved impedance matching has been achieved at the interface between air and silicon substrate, reducing THz reflection significantly. So far, anti-reflection effects have been realized in a broadband range from 0.2 THz to 3.2 THz, and benefits may be had below and above that range as well. A maximum 89% reduction in reflectivity of THz power has been observed when the sample with 60-μm-period micro-pyramids is used, comparing with reflectivity of planar silicon substrate. By varying the period of micro-pyramid structures from 110 μm to 30 μm, the cut-off frequency of enhanced transmission has been tuned from 0.74 THz to 2.93 THz and the bandwidth of enhancement has increased from 0.91 THz to 3.15 THz, respectively. Desirably, the micro-pyramid structures have a period less than 100 μm or 90 μm and greater than 30 μm, such as a period between about 30 μm and about 60 μm. Although the apparatus has been demonstrated as anti reflection device for silicon-based components, this design can be used for other substrate material too, such as semiconductors, polymers, and so on.

Having thus described several embodiments of an apparatus for achieving tunable and broadband anti-reflection functions for silicon at terahertz frequencies, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention.

Although specific setpoints and ranges may have been disclosed herein for the embodiments described, other embodiments may utilize other setpoints, dimensions, and ranges while still falling within the scope of the claimed invention. The method or process steps described in the disclosed embodiments are just examples.

There may be many variations to the process steps or (or operations) described herein without departing from the spirit of the invention. For instance, the steps may be performed in a differing order, or steps may be added, deleted, or modified. All of these variations are considered a part of the claimed invention. Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

The invention claimed is:

1. A method for modifying terahertz radiation, the method comprising:
   receiving terahertz radiation on a device having an anti-reflection layer having an outer surface comprising a plurality of pyramid structures having about a 30 μm to a 110 μm period; and
   modifying the terahertz radiation passing through the device or processing the terahertz radiation in the device.

2. The method of claim 1 wherein the device comprises a lens, and the modifying comprises focusing the terahertz radiation.

3. The method of claim 1 wherein the device comprises a filter, and the modifying comprises filtering the terahertz radiation.

4. The method of claim 1 wherein the device comprises a beam splitter, and the modifying comprises directing a first portion of the terahertz radiation a first direction and directing a second portion of the terahertz radiation in a second direction different from the first direction.

5. The method of claim 1 wherein the device comprises a semiconductor device, and the processing comprises processing the terahertz radiation in the semiconductor device.

6. The method of claim 1 wherein the terahertz radiation is in the range of 0.2 THz to 3.2 THz.

7. The method of claim 1 wherein the period of the plurality of pyramid structures is between about 30 μm and about 60 μm.

8. The method of claim 1 wherein the period of the plurality of pyramid structures comprises about 30 μm.

9. The method of claim 1 wherein the period of the plurality of pyramid structures comprises about 60 μm.

10. A broadband anti-reflection apparatus for use with terahertz radiation, the apparatus comprising:
    a layer having an outer surface comprising a plurality of pyramid structures having about a 30 μm to about a 110 μm period; and
    wherein reflectance of the terahertz radiation is reduced compared to a layer comprising a planar outer surface.

11. The apparatus of claim 10 wherein the period of the plurality of pyramid structures is between about 30 μm and about 60 μm.

12. The apparatus of claim 10 wherein the period of the plurality of pyramid structures comprises about 30 μm.

13. The apparatus of claim 10 wherein the period of the plurality of pyramid structures comprises about 45 μm period.

14. The apparatus of claim 10 wherein the period of the plurality of pyramid structures comprises about 60 μm period.

15. The apparatus of claim 10 wherein the period of the plurality of pyramid structures comprises about 70 μm period.

16. The apparatus of claim 10 wherein the period of the plurality of pyramid structures comprises about 110 μm period.

17. The apparatus of claim 10 wherein the layer comprises the plurality of pyramid structures defining a two-dimensional surface.

18. The apparatus of claim 10 wherein the layer comprises silicon.

19. The apparatus of claim 18 wherein the device comprises a filter for filtering the terahertz radiation.

20. The apparatus of claim 18 wherein the device comprises a beam splitter for directing terahertz radiation in a first direction and in a second direction different from the first direction.

21. The apparatus of claim 10 further comprising the layer disposed on a device for modifying terahertz radiation.

22. The apparatus of claim 21 wherein the device comprises a lens for focusing the terahertz radiation.

23. The apparatus of claim 10 further comprising the layer disposed on a device for processing the terahertz radiation.

24. The apparatus of claim 10 wherein the device comprises a semiconductor device.

* * * * *